US012657065B2

(12) United States Patent
Reddy

(10) Patent No.: US 12,657,065 B2
(45) Date of Patent: Jun. 16, 2026

(54) DUAL LEVEL MULTI-TENANCY FOR EXPOSING ARTIFICIAL INTELLIGENCE CONTENT AS CLOUD SERVICE

(71) Applicant: SAP SE, Walldorf (DE)

(72) Inventor: Srinivasa Byaiah Ramachandra Reddy, Bangalore (IN)

(73) Assignee: SAP SE, Walldorf (DE)

( * ) Notice: Subject to any disclaimer, the term of this patent is extended or adjusted under 35 U.S.C. 154(b) by 802 days.

(21) Appl. No.: 17/821,276

(22) Filed: Aug. 22, 2022

(65) Prior Publication Data

US 2024/0061719 A1 Feb. 22, 2024

(51) Int. Cl.
*G06F 9/50* (2006.01)

(52) U.S. Cl.
CPC .......... *G06F 9/5055* (2013.01); *G06F 9/5077* (2013.01); *G06F 2209/5011* (2013.01); *G06F 2209/508* (2013.01)

(58) Field of Classification Search
CPC .............................. G06F 9/45533–5094; G06F 2209/5011–5015; G06F 2209/508
See application file for complete search history.

(56) References Cited

U.S. PATENT DOCUMENTS

| 8,291,490 | B1 * | 10/2012 | Ahmed | .................. | G06F 21/604 |
| | | | | | 726/20 |
| 11,163,586 | B1 * | 11/2021 | Mathur | .................. | G06F 9/3836 |

| 2014/0173694 | A1 * | 6/2014 | Kranz | ..................... | H04L 63/10 |
| | | | | | 726/4 |
| 2015/0120938 | A1 * | 4/2015 | Mordani | ............. | H04L 41/5054 |
| | | | | | 709/226 |
| 2016/0094624 | A1 * | 3/2016 | Mordani | ............... | G06F 16/278 |
| | | | | | 709/203 |
| 2017/0339121 | A1 * | 11/2017 | Eberlein | ............... | G06F 16/211 |

(Continued)

OTHER PUBLICATIONS

Multi-Tenancy and Sub-Tenancy Architecture in Software-as-a-Service (SaaS) Wei-Tek Tsai and Peide Zhong (Year: 2014).*

(Continued)

*Primary Examiner* — April Y Blair
*Assistant Examiner* — Paul V Mills
(74) *Attorney, Agent, or Firm* — Mintz Levin Cohn Ferris Glovsky and Popeo, P.C.

(57) ABSTRACT

A method for exposing artificial intelligence content as a cloud service may include onboarding, by a service broker of a core platform hosting an artificial intelligence (AI) resource, a service provider tenant providing the artificial intelligence resource. The onboarding of the first service provider tenant includes creating, at the core platform, a function specific service broker associated with the artificial intelligence resource. The function specific service broker may then onboard one or more service consumer tenants for accessing the artificial intelligence resource associated with the first provider tenant. Moreover, in response to the one or more service consumer tenants accessing the artificial intelligence resource, the function specific service broker may authenticate the one or more service consumer tenants and meter a usage of the artificial intelligence resource by the one or more service consumer tenants. Related methods and computer program products are also disclosed.

13 Claims, 10 Drawing Sheets

(56)                 References Cited

U.S. PATENT DOCUMENTS

| | | | | |
|---|---|---|---|---|
| 2018/0146056 | A1* | 5/2018 | Eberlein | G06F 9/54 |
| 2019/0222988 | A1* | 7/2019 | Maes | H04L 41/5054 |
| 2019/0332437 | A1* | 10/2019 | Van Hoof | G06F 9/5061 |
| 2021/0099301 | A1* | 4/2021 | Busjaeger | G06F 16/9035 |
| 2021/0218743 | A1* | 7/2021 | Ahuja | H04L 63/102 |
| 2021/0318913 | A1* | 10/2021 | Moyer | G06F 8/70 |
| 2021/0334146 | A1* | 10/2021 | Kulkarni | G06F 8/31 |
| 2022/0345441 | A1* | 10/2022 | Tanba | H04L 61/3015 |
| 2022/0391747 | A1* | 12/2022 | Ashrafzadeh | G06N 20/00 |
| 2023/0069604 | A1* | 3/2023 | Subramani Jayavelu | |
| | | | | G06F 9/547 |

OTHER PUBLICATIONS

Develop and Register Multitenant Application to the SAP SaaS Provisioning Service on the SAP BTP: General Tia Xu community. sap.com/t5/technology-blog-posts-by-sap/multitenancy-develop-and-register-multitenant-application-to-the-sap-saas/ba-p/13538813 (Year: 2021).*

Develop and Register Multitenant Application to the SAP SaaS Provisioning Service on the SAP BTP: Hands-on Tutorial on Kyma Tia Xu community.sap.com/t5/technology-blog-posts-by-sap/ multitenancy-develop-and-register-multitenant-application-to-the-sap-saas/ba-p/13529117 (Year: 2022).*

Practical Model-Driven Enterprise Architecture Mudar Bahri, Joe Williams p. 126-128 (Year: 2022).*

Behavioral Robustness of Software System Designs Changjian Zhang Carnegie Mellon University, thesis proposal, p. 5 (Year: 2024).*

Behavior Specification in a Software Design System Jack C. Wileden, John Sayler, William E. Riddle, Alan R. Segal, Allan M. Stavely (Year: 1983).*

* cited by examiner

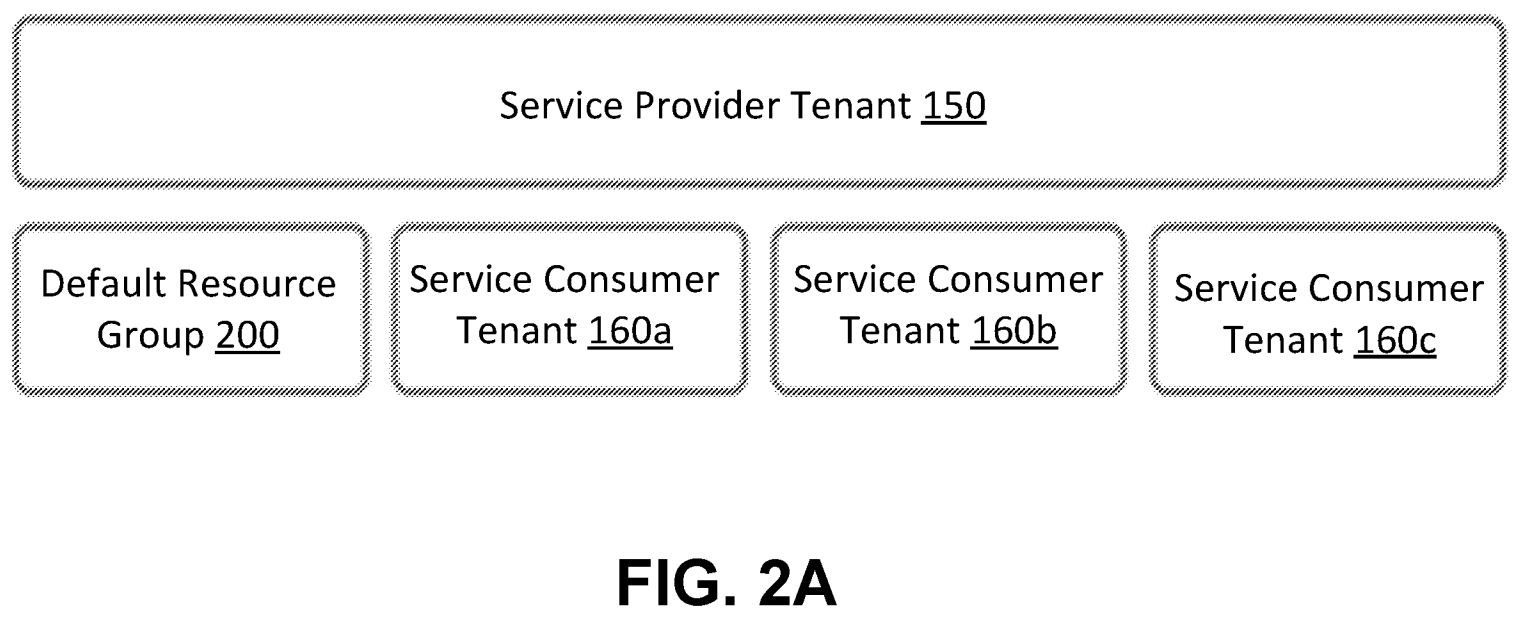

Service Provider Tenant 150

Service Consumer Tenant 160c

Service Consumer Tenant 160b

Service Consumer Tenant 160a

Default Resource Group 200

FIG. 2A

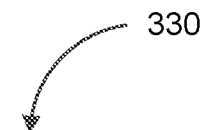
Service Provider Flow for
Content Based Approach
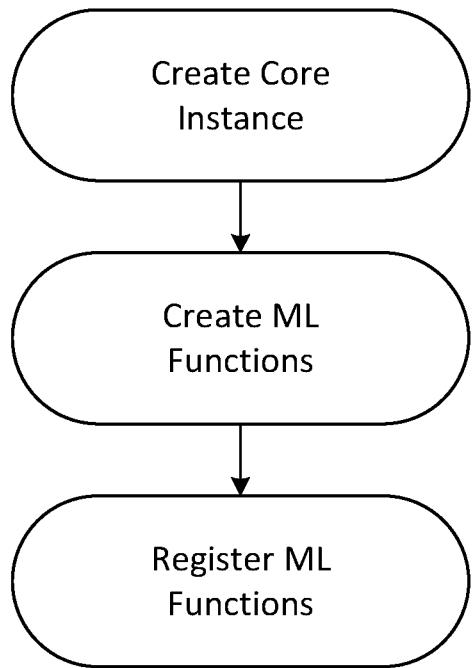
FIG. 3C

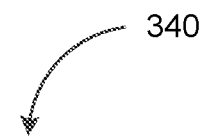
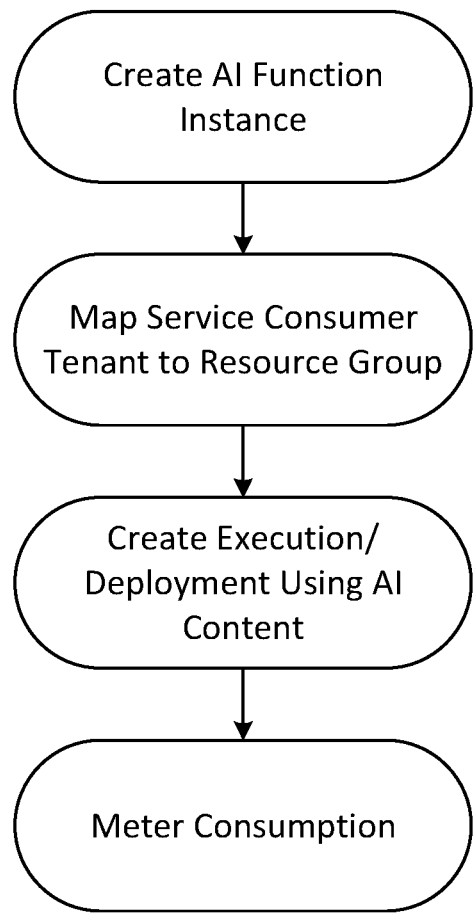
Service Consumer Flow for App
and Content Based Approach
Create AI Function
Instance
Map Service Consumer
Tenant to Resource Group
Create Execution/
Deployment Using AI
Content
Meter Consumption
FIG. 3D

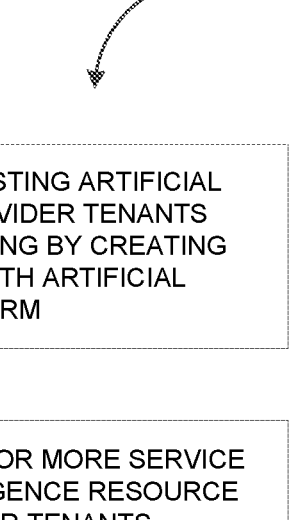

400

402

ONBOARD, BY SERVICE BROKER OF CORE PLATFORM HOSTING ARTIFICIAL INTELLIGENCE RESOURCE, ONE OR MORE SERVICE PROVIDER TENANTS PROVIDING ARTIFICIAL INTELLIGENCE RESOURCE INCLUDING BY CREATING FUNCTION SPECIFIC SERVICE BROKER ASSOCIATED WITH ARTIFICIAL INTELLIGENCE RESOURCE AT CORE PLATFORM

404

ONBOARD, BY FUNCTION SPECIFIC SERVICE BROKER, ONE OR MORE SERVICE CONSUMER TENANTS FOR ACCESSING ARTIFICIAL INTELLIGENCE RESOURCE ASSOCIATED WITH ONE OR MORE SERVICE PROVIDER TENANTS

406

RESPOND TO ONE OR MORE SERVICE CONSUMER TENANTS ACCESSING ARTIFICIAL INTELLIGENCE RESOURCE BY AT LEAST AUTHENTICATING THE ONE OR MORE SERVICE CONSUMER TENANTS AND METERING USAGE OF ARTIFICIAL INTELLIGENCE RESOURCE ASSOCIATED WITH ONE OR MORE SERVICE CONSUMER TENANTS

FIG. 4

DUAL LEVEL MULTI-TENANCY FOR EXPOSING ARTIFICIAL INTELLIGENCE CONTENT AS CLOUD SERVICE

FIELD

The present disclosure generally relates to cloud computing and more specifically to exposing artificial intelligence based content as a cloud service using dual level multi-tenancy.

BACKGROUND

Machine learning models may be trained to perform a variety of cognitive tasks including, for example, object identification, natural language processing, information retrieval, speech recognition, classification, regression, and/or the like. As one example use case, an enterprise resource planning (ERP) system may include an issue tracking system configured to generate a ticket in response to an error reported via one or more telephone calls, emails, short messaging service (SMS) messages, social media posts, web chats, and/or the like. The issue tracking system may generate the ticket to include text describing the error associated with the ticket. Accordingly, in order to determine a suitable response for addressing the error associated with the ticket, the enterprise resource planning system may include a machine learning model trained to perform natural language processing (NLP). For instance, the machine learning model may be trained to assign, based at least on the text describing the error, one or more labels indicating a sentiment, a topic, and/or an intent associated with the text, thus allowing the enterprise resource planning system to determine a priority for the ticket that corresponds to the severity of the error. Training the machine learning model to perform natural language processing may include adjusting the machine learning model, such as the weights applied by the machine learning model, to minimize the errors present in the output of the machine learning model.

SUMMARY

Methods, systems, and articles of manufacture, including computer program products, are provided for exposing artificial intelligence content as a cloud service. In one aspect, there is provided a system. The system may include at least one data processor and at least one memory. The at least one memory may store instructions that result in operations when executed by the at least one data processor. The operations may include: onboarding, by a service broker of a core platform hosting an artificial intelligence (AI) resource, a first service provider tenant providing the artificial intelligence resource, the onboarding of the first service provider tenant includes creating, at the core platform, a function specific service broker associated with the artificial intelligence resource; onboarding, by the function specific service broker, one or more service consumer tenants for accessing the artificial intelligence resource associated with the first provider tenant; and in response to the one or more service consumer tenants accessing the artificial intelligence resource, authenticating, by the function specific service broker, the one or more service consumer tenants and metering a usage of the artificial intelligence resource by the one or more service consumer tenants.

In another aspect, there is provided a method for exposing artificial intelligence content as a cloud service. The method may include: onboarding, by a service broker of a core platform hosting an artificial intelligence (AI) resource, a first service provider tenant providing the artificial intelligence resource, the onboarding of the first service provider tenant includes creating, at the core platform, a function specific service broker associated with the artificial intelligence resource; onboarding, by the function specific service broker, one or more service consumer tenants for accessing the artificial intelligence resource associated with the first provider tenant; and in response to the one or more service consumer tenants accessing the artificial intelligence resource, authenticating, by the function specific service broker, the one or more service consumer tenants and metering a usage of the artificial intelligence resource by the one or more service consumer tenants.

In another aspect, there is provided a computer program product that includes a non-transitory computer readable storage medium. The non-transitory computer-readable storage medium may include program code that causes operations when executed by at least one data processor. The operations may include: onboarding, by a service broker of a core platform hosting an artificial intelligence (AI) resource, a first service provider tenant providing the artificial intelligence resource, the onboarding of the first service provider tenant includes creating, at the core platform, a function specific service broker associated with the artificial intelligence resource; onboarding, by the function specific service broker, one or more service consumer tenants for accessing the artificial intelligence resource associated with the first provider tenant; and in response to the one or more service consumer tenants accessing the artificial intelligence resource, authenticating, by the function specific service broker, the one or more service consumer tenants and metering a usage of the artificial intelligence resource by the one or more service consumer tenants.

In some variations of the methods, systems, and computer program products, one or more of the following features can optionally be included in any feasible combination.

In some variations, the onboarding of the first service provider tenant may include receiving, from the first service provider tenant, a custom resource definition defining a runtime behavior of each machine learning enabled function included in the artificial intelligence resource, and registering the function specific service broker associated with the artificial intelligence resource.

In some variations, the service broker of the core platform may be a shared resource amongst the first service provider tenant and a second service provider tenant.

In some variations, the one or more service consumer tenants may be sub-tenants of the first service provider tenant.

In some variations, the onboarding of the one or more service consumer tenants may include creating, for each service consumer tenant, a resource group mapped to the artificial intelligence resource.

In some variations, in response to a service consumer tenant accessing the artificial intelligence resource, the service consumer tenant may be mapped to a corresponding resource group in order to create an execution or deployment of a machine learning enabled function associated with the artificial intelligence resource and meter a usage corresponding to the execution or deployment of the machine learning enabled function.

In some variations, the mapping may include determining, based at least on a first identifier of the service consumer tenant and a second identifier of the artificial intelligence resource, a third identifier of the corresponding resource group.

In some variations, the onboarding of the one or more service consumer tenants may include updating an onboarded tenant list to indicate an association between the one or more service consumer tenants and the artificial intelligence resource. The function specific service broker may authenticate the one or more service consumer tenant based at least on the onboarded tenant list.

In some variations, the artificial intelligence resource may be embedded within an application and exposed for indirect consumption by the one or more service consumer tenants.

In some variations, the artificial intelligence resource may be exposed for direct consumption by the one or more service consumer tenants.

In some variations, the artificial intelligence resource includes one or more machine learning enabled functions.

In some variations, a service manager may route an onboard request from the one or more service consumer tenants to the function specific service broker associated with the artificial intelligence resource.

Implementations of the current subject matter can include methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to exposing artificial intelligence (AI) based content, it should be readily understood that such features are not intended to be limiting. The claims that follow this disclosure are intended to define the scope of the protected subject matter.

DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

4

Figure 1A:
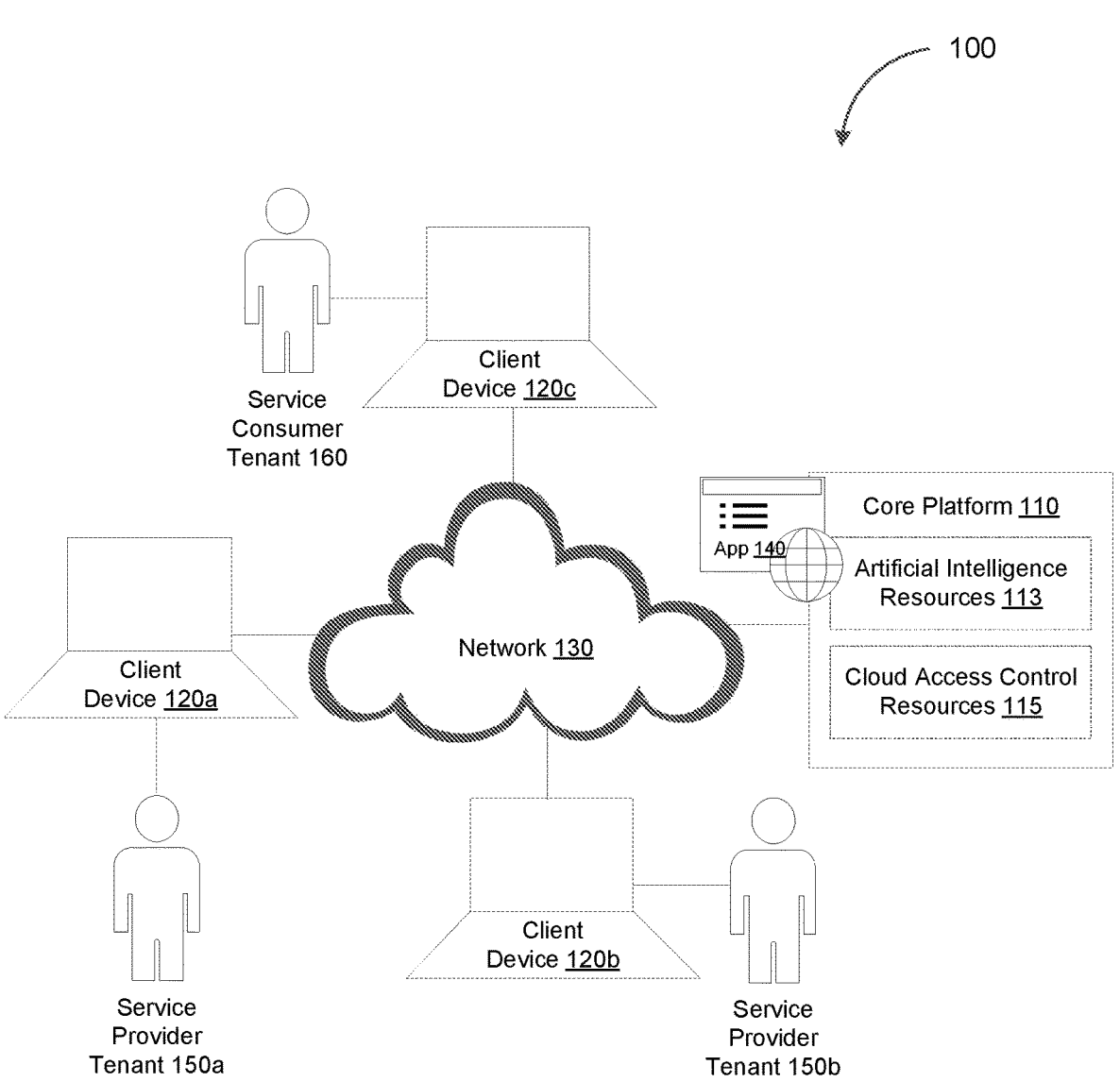
FIG. 1A depicts a system diagram illustrating a cloud computing system, in accordance with some example embodiments.
Figure 1B:
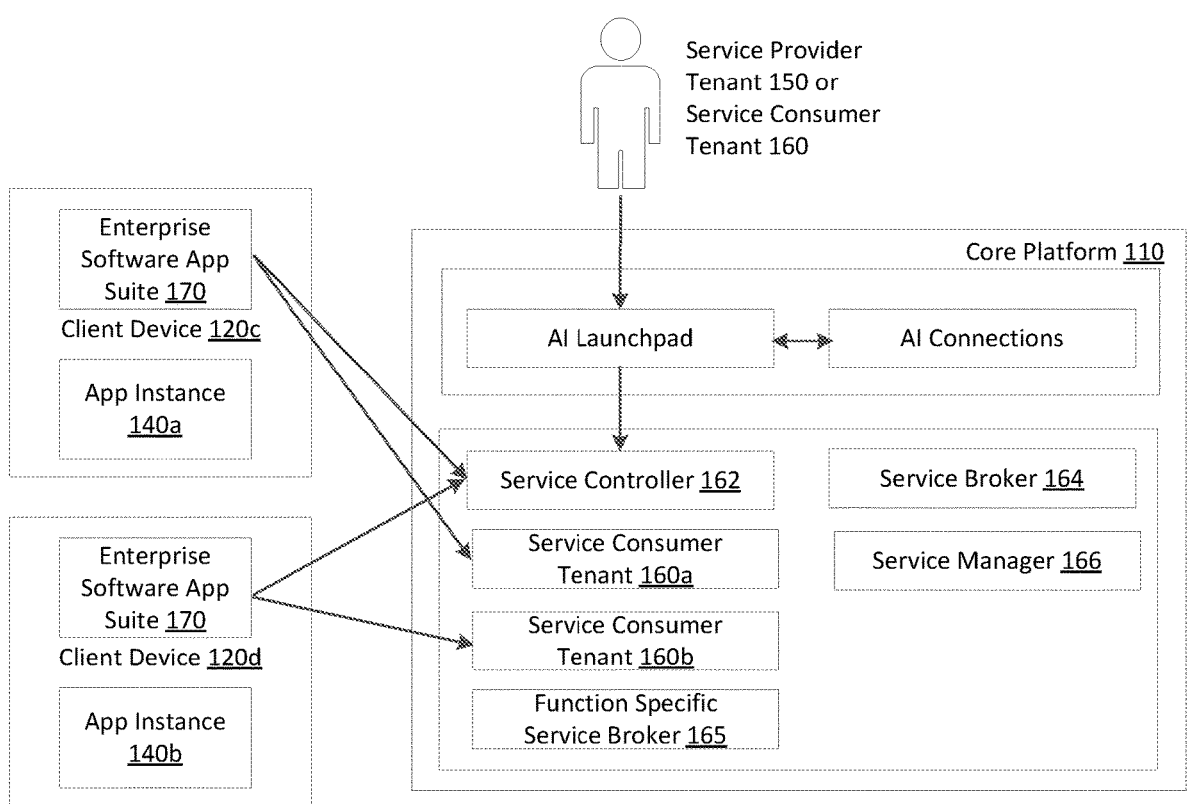
Figure 2B:
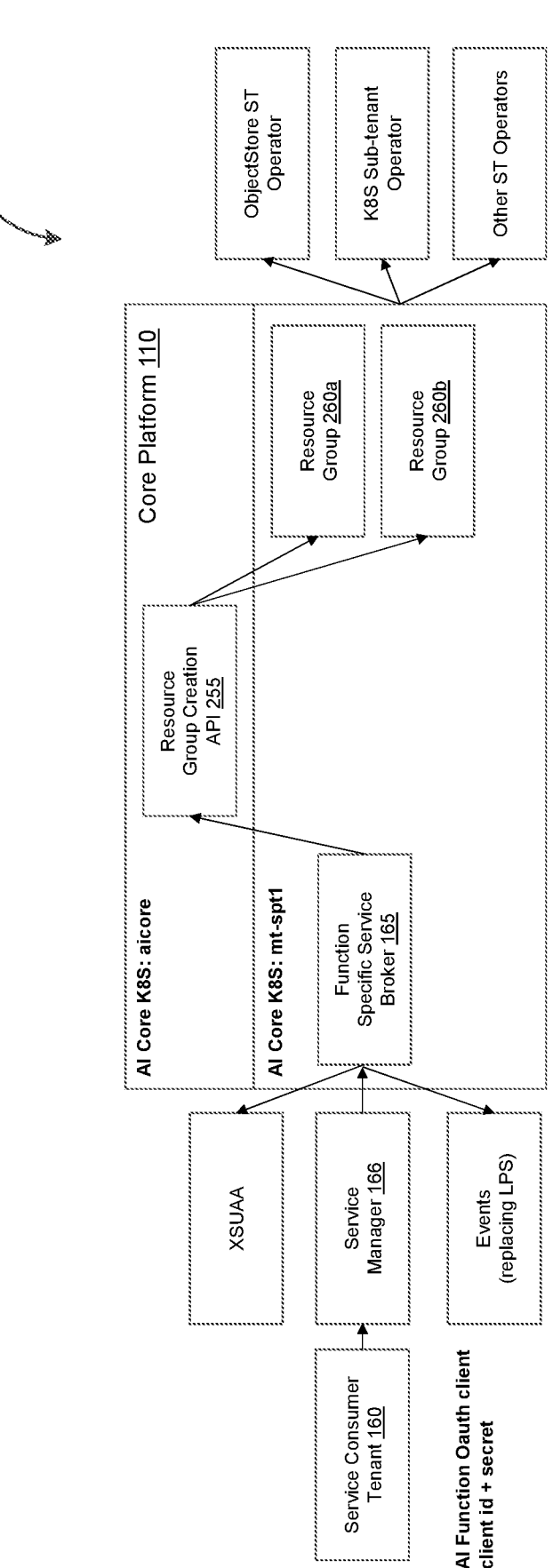
Figure 3A:
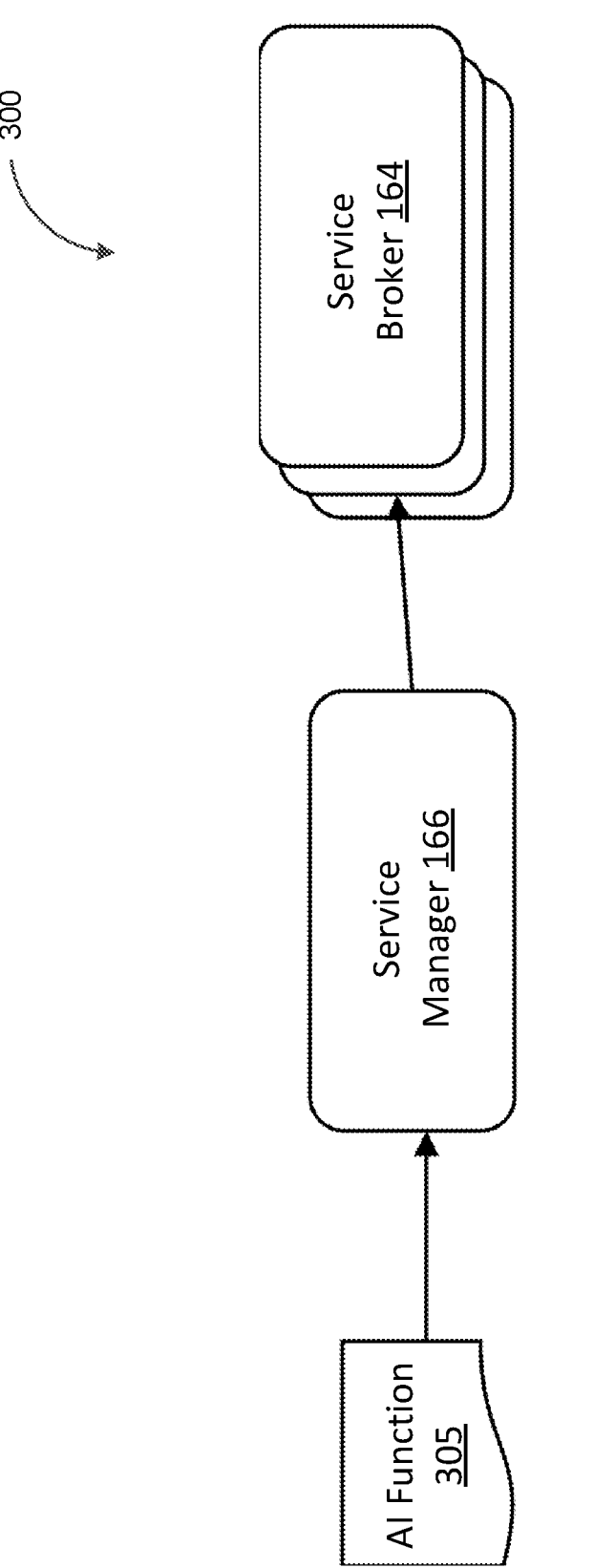
Figure 3B:
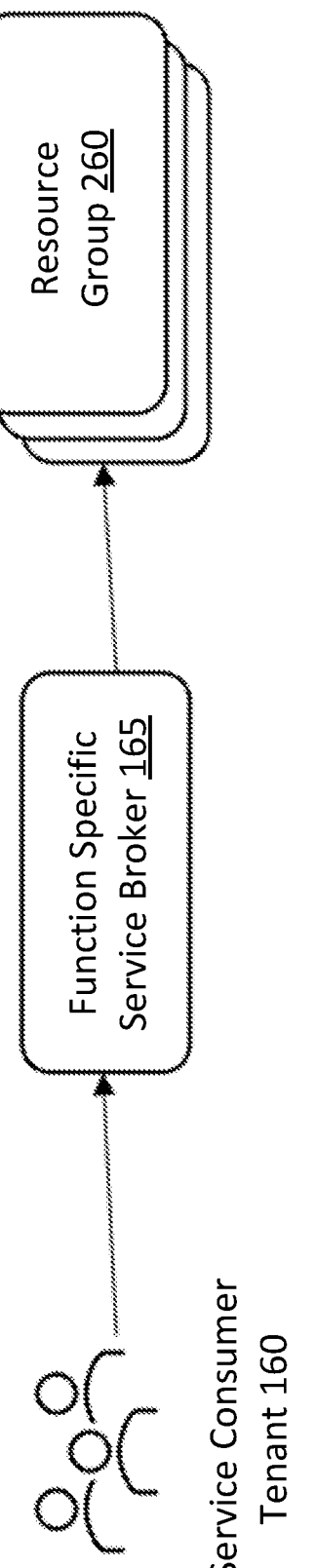
Figure 5:
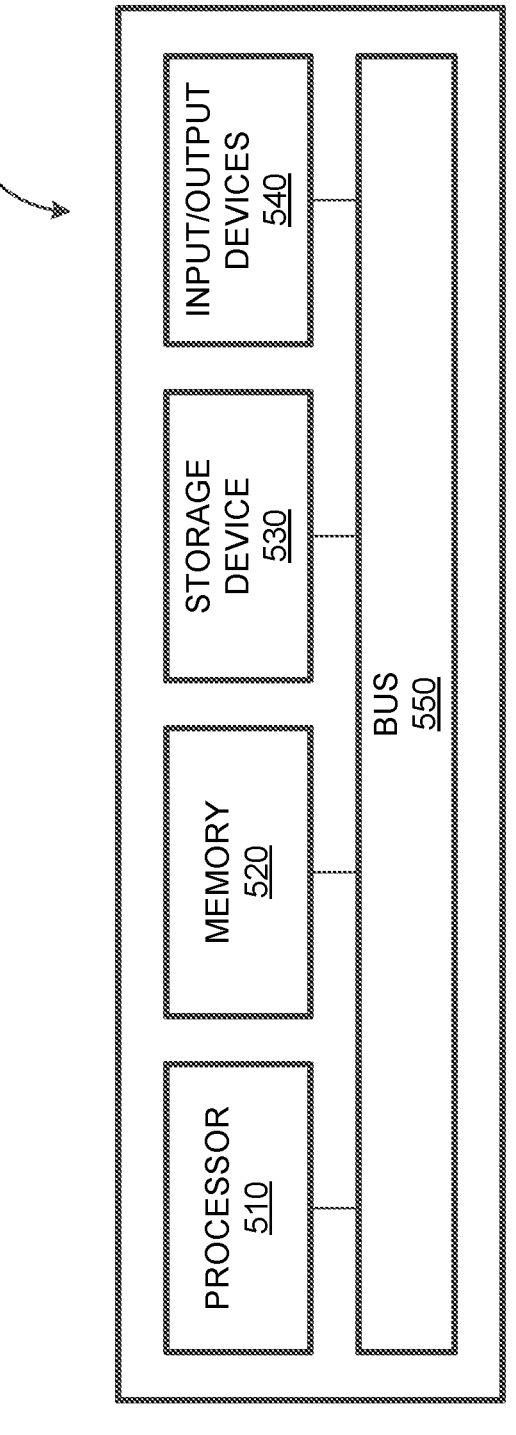

FIG. 1B depicts a block diagram illustrating an example of a core platform, in accordance with some example embodiments;

FIG. 2A depicts a schematic diagram illustrating an example of dual level tenancy, in accordance with some example embodiments;

FIG. 2B depicts a schematic diagram illustrating an example of a process for onboarding an service consumer tenant, in accordance with some example embodiments;

FIG. 3A depicts a schematic diagram illustrating, in accordance with some example embodiments;

FIG. 3B depicts a schematic diagram illustrating, in accordance with some example embodiments;

FIG. 3C depicts a flowchart illustrating an example of a process for creating artificial intelligence (AI) content, in accordance with some example embodiments;

FIG. 3D depicts a flowchart illustrating an example of a process for accessing artificial intelligence (AI) content, in accordance with some example embodiments;

FIG. 4 depicts a flowchart illustrating an example of a process for exposing artificial intelligence content as a cloud service, in accordance with some example embodiments; and FIG. 5 depicts a block diagram illustrating an example of a computing system, in accordance with some example embodiments.

When practical, like labels are used to refer to same or similar items in the drawings.

DETAILED DESCRIPTION

Artificial intelligence (AI) based content may be hosted by a cloud-computing platform such that the content may be remotely accessible to multiple tenants, for example, over the Internet as a software as a service (SaaS), a platform as a service (PaaS), and/or the like. For example, the one or more machine learning enabled functions may be exposed directly or embedded within a software application, which may be an enterprise software application for sourcing, procurement, supply chain management, invoicing, payment, and/or the like. An artificial intelligence (AI) service provider may first develop the artificial intelligence content including, for example, the building, training, and deployment of various machine learning models. Moreover, to support a cloud-based deployment of the artificial intelligence (AI) content, the artificial intelligence (AI) service provider may be required to create and maintain a variety of cloud access control resources including, for example, a service broker for onboarding tenants, tenant provisioning endpoints, an application programming interface (API) proxy for authentication and authorizations, application programming interface (API) gateway security services, metering and billing services, auditing services, logging services, monitoring services, and/or the like.

In a conventional single level tenancy paradigm, the artificial intelligence (AI) service provider may be a tenant to the cloud platform for purposes of developing artificial intelligence (AI) content for either direct exposure or indirect exposure through one or more software applications. The artificial intelligence (AI) service provider may be a so-called service provider tenant. The development of the artificial intelligent (AI) content may include the artificial intelligence (AI) service provider registering the source code repository, creating the artificial intelligence (AI) content or workflows (e.g., in the form of workflow templates or serving templates), and providing docker images of the artificial intelligence (AI) algorithms and source code.

Moreover, in order to expose this artificial intelligence (AI) content for direct or indirect consumption, the artificial intelligence (AI) service provider may be required to create an artificial intelligence (AI) content specific service broker for onboarding tenants accessing the artificial intelligence (AI) content. Once the tenants of the artificial intelligence (AI) content is onboarded, the artificial intelligence (AI) service provider is further required to create and maintain numerous other cloud access control resources such as authentication and authorizations, tenant validations, application programming interface (API) gateway security services, metering and billing services, auditing services, logging services, monitoring services, and/or the like.

The creation and maintenance of cloud access control resources may consume an excessive amount of time and resources, which thwarts cloud-based deployment of artificial intelligence (AI) content. Moreover, in a conventional single level tenancy paradigm, multiple artificial intelligence (AI) service providers may expend duplicative efforts to implement nearly identical cloud access features. As such, in some example embodiments, an artificial intelligence (AI) core platform may be configured to support dual level tenancy in which various artificial service (AI) service provider tenants share a variety of cloud access control resources for the artificial intelligence (AI) content hosted at the artificial intelligence (AI) core platform. For example, the artificial intelligence (AI) core platform may create and maintain various cloud access control resources such as service broker for onboarding tenants, tenant provisioning endpoints, application programming interface (API) proxy for authentication and authorizations, application programming interface (API) gateway security services, metering and billing services, auditing services, logging services, monitoring services, and/or the like. Instead of creating and maintaining its own cloud access control resources, an artificial intelligence (AI) service provider tenant may access the shared cloud access control resources in order to expose its artificial intelligence (AI) content for direct or indirect consumption by one or more artificial intelligence (AI) service consumer tenants.

FIG. 1A depicts a system diagram illustrating an example of a cloud computing system 100, in accordance with some example embodiments. Referring to FIG. 1A, the cloud computing system 100 may include a core platform 110 and one or more client devices 120 communicatively coupled via a network 130. The one or more client devices 130 may be processor-based devices including, for example, a smartphone, a tablet computer, a wearable apparatus, a virtual assistant, an Internet-of-Things (IoT) appliance, and/or the like. The network 130 may be a wired network and/or a wireless network including, for example, a wide area network (WAN), a local area network (LAN), a virtual local area network (VLAN), a public land mobile network (PLMN), the Internet, and/or the like.

In some example embodiments, the core platform 110 may be configured to support dual level tenancy. Accordingly, the core platform 110 may host one or more artificial intelligence (AI) resources 113 developed by a first service provider tenant 150a. Furthermore, the core platform 110 may also host one or more cloud access control resources 115 to support access to the one or more artificial intelligence resources 113 by one or more service consumer tenants 160. The one or more cloud access control resources 115 may include a generic service broker 164 for onboarding and offboarding the service consumer tenants 160 (e.g., as required by General Data Protection Regulation (GDPR)) to ensure no orphan data is stored after offboarding, tenant provisioning endpoints, an application programming interface (API) proxy for authentication and authorizations, application programming interface (API) gateway security services, metering and billing services, auditing services, logging services, monitoring services, and/or the like. In the dual level tenancy paradigm of the core platform 110, the first service provider tenant 150a may share the one or more cloud access control resources 115 with other service provider tenants of the core platform 110 such as a second service provider tenant 150b.

In some example embodiments, the core platform 11 may automatically create a machine learning enabled function as a cloud-based service using artificial intelligence content developed by the one or more service provider tenants 150. For example, the core platform 110 may support a new custom resource definition called AI-Function.yaml, which accepts the necessary configurations to define the runtime behaviour of each machine learning enabled function. Accordingly, the first service provider tenant 150a may create the one or more artificial intelligence resources 113, for example, by developing one or more machine learning enabled functions and defining a corresponding custom resource file (AIFunction.yaml) in declarative manner based on the AIFunction custom resource definition. FIG. 3C depicts a flowchart illustrating an example of a process 330 in which an instance of the core platform 110 is created for each service provider tenant 150 before one or more machine learning enabled functions are created and registered. For instance, the service provider tenant 150 may register function specific service broker 165 (e.g., using the service broker uniform resource locator (URL), username, and password) in the service marketplace and Center for Internet Security (CIS) in order to expose and commercialize the service (e.g., "Line item matching AI service").

FIG. 1B depicts a block diagram illustrating an example of the core platform 110, in accordance with some example embodiments. As shown in FIG. 1B, the core platform 110 may include the service broker 164, which is a part of the shared cloud access control resources 115 that are shared across multiple tenants in order to support dual level tenant onboarding. In particular, the service broker 164 may be configured to onboard i.e. the service broker will onboards the one or more service provider tenants 150. Meanwhile, one or more machine learning enabled function specific service brokers 165 may also be deployed, maintained, and managed by the core platform 110. These machine learning enabled function specific service brokers 165 may be configured to onboard the one or more service consumer tenants 160 of each service provider tenant 150. In the example shown in FIG. 1B, the machine learning enabled function specific service broker 165 may onboard the service consumer tenants 160 of artificial intelligence resources 113 exposed for direct consumption via an application 140, which may be a part of an enterprise software application suite 170 deployed at the one or more client devices 120 of the one or more service consumer tenants 160.

In some example embodiments, dual level tenancy may be implemented based on a grouping concept in which one or more resource groups are mapped to the artificial intelligence resources 113, which includes the corresponding workflow templates, serving templates, and docker images used in the templates. FIG. 2A depicts a schematic diagram illustrating an example of dual level tenancy in which a single service provider tenant 150 is associated with multiple resource groups including, for example, a default resource group 200 and a resource group for each of a first service consumer tenant 160a, a second service consumer tenant 160*b*, and a third service consumer tenant 160*c*. In this paradigm, each service consumer tenant 160 may be a sub-tenant of the service provider tenant 150.

Referring again to FIG. 1B, the core platform 110 may include a service controller 162 configured to accept incoming requests from the one or more service consumer tenants 160 of the service provider tenant 150. Furthermore, the service controller 162 may support various lifecycle operations associated with the artificial intelligence resources 113, which include various machine learning operations such as model training, artifact management, model deployment, model explainability analysis, and/or the like. FIG. 3D depicts a flowchart illustrating an example of a process 340 in which an instance of a machine learning enabled function is created for the one or more service consumer tenants 160 before the one or more service consumer tenants 160 are mapped to a resource group associated with the artificial intelligence resources 113. As shown in FIG. 3D, the core platform 110 may create an execution and deployment of the artificial intelligence resources 113, and meter the consumption of the artificial intelligence resource 113 by the one or more service consumer tenants 160.

As noted, the first service provider tenant 150*a* may create the one or more artificial intelligence resources 113, for example, by developing one or more machine learning enabled functions and defining a corresponding custom resource file (AIFunction.yaml) in declarative manner based on the AIFunction custom resource definition. Referring again to FIG. 1B, the service controller 162 may support creation, updating, reading, and deletion of the custom resource definitions for the one or more artificial intelligence resources 113. Moreover, the service controller 162 may deploy and manage the function specific service broker 165 associated with the one or more artificial intelligence resources 113 as well as various dependent services in the tenant namespace. Examples of these dependent services include storage, user authentication and authorization, and metering. Some of the parameters required by to perform the machine learning enabled functions of the one or more artificial intelligence resources 113 may be passed as parameters while creating the dependent services.

In some example embodiments, the onboarding of the service provider tenant 150, which is performed by the service broker 164, may include creating and provisioning a content package associated with the one or more artificial intelligence resources 113. This may include the service provider tenant 150 setting up a developer paradigm (e.g., gitOps) and providing a content package that includes various workflow templates and serving templates (e.g., including docker registry). The service provider tenant 150 may provide service broker details in a AIFunction.yaml custom resource file delivered in a source code repository (e.g., gitOps flow) or via calls to an administrator application programming interface (API) (e.g., POST/admin/aifunctions with yaml file content as request body). Table 1 below depicts an example of a AIFunction.yaml custom resource file for creating a new machine learning enabled function.

TABLE 1

```
apiVersion: "ai.sap.com/v1alpha"
kind: AIFunction
metadata:
   name: cashapp
   labels:
      ...
   annotations:
      ...
spec:
   description: "cashapp service"
   brokerSecret:
      name: aifn-sb-secret
      usernameKeyRef: username
      passwordKeyRef: password
   serviceCatalog:
      - extendCatalog:
         bindable: true
         description: "Service for CashApp"
         id: cashapp-service-broker
         name: CashAppService
         plans:
         - description: "Provisions standard XSUAA OAuth Client to access the cashapp
service implementations"
            free: false
            id: "cash-app-standard"
            metadata:
               supportedPlatforms:
               - cloudfoundry
               - kubernetes
               - sapbtp
            name: standard
         extendCredentials:
            shared:
               serviceUrls:
                  AI_APL_URL: https://api.ai.devsg.eu-central-1.mlf-aws-dev.com
      capabilities:
         basic:
            createExecutions: true
            multiTenant: true
            staticDeployments: true
            userDeployments: true
         logs:
            deployments: false
```

TABLE 1-continued

```
executions: true
○ config supports AI API capabilities metadata
"capabilities": {
    "multitenant": true,
    "listDeployments": true,
    "createDeplyoments":true,
    "createExecutions": true,
    "logs": true,
"capablityThatDoesNotNeedToBeListedBecauseWhatIsNotPresentIsFalseByDefault":
false
}
○ config accepts generic secret prestored in AI Core using secret management
        admin APIs. This secret values are used as service broker environment
        variables
    "secret": {
        "name": aifn-sb-secret,
        "resource-group": default
}
```

As shown in FIG. 3A, the service provider tenant 150 may invoke the service manager 166 through the administrator endpoint admin/aifunctions and the application programming interface (API) call "GET admin/aifunctions" to get a list of the various function specific service brokers 165. Table 2 depicts an example of a list that includes the function specific service broker 165 of the application 140.

TABLE 2

```
AIFunction CR name
AIFunction URL
{
"count": 1,
"resources": [
    {
        "name": "cashapp",
        "description": "cashapp service",
        "status": "PROVISIONED",
        "statusMessage": "",
```

TABLE 2-continued

```
        "url": "mt-a1cce65d-cashapp.servicebroker.devsg.eu-central-
1.mlf-
        aws-dev.com"
    }
]
}
```

More specific details for the function specific service broker 165 may be retrieved by the service provider tenant 150 invoking the admin endpoint admin/aifunctions/<function_name>. Table 3 below depicts an example of function specific service provider details. Examples of such details include service broker uniform resource locators (URLs), capabilities, secret references, service broker status, and logs.

TABLE 3

```
{
    "name": "cashapp",
    "description": "cashapp service",
    "status": "PROVISIONED",
    "statusMessage": "",
    "url": "mt-a1cce65d-cashapp-123abc.ai.devsg.eu-central-1.mlf-aws-dev.com",
    "brokerSecret": {
        "name": "generic-secret-name",
        "usernameKeyRef": "username",
        "passwordKeyRef": "password"
    },
    "serviceCatalog": {
        "name":"aibus-test-devsg",
        "description":"Service for AI applications to train and deploy ML models",
        "bindable": true,
        "plans":[
            {
                "id":"aibus-test-devsg-standard",
                "description":"Provisions standard XSUAA OAuth Client to access the aicore
service implementations",
                "name": "standard",
                "free": false,
                "metadata": {
                    "supportedPlatforms":[
                        "cloudfoundry",
                        "kubernetes",
                        "sapbtp"
                    ]
                }
            }
        ],
        "capabilities": {
```

TABLE 3-continued

```
    "basic": {
        "createExecutions": true,
        "staticDeployments": true,
        "userDeployments": true
    },
    "logs": {
        "deployments": false,
        "executions": true
    }
},
"tenants": [
    {
        "name": "tenant-id",
        "createdAt": "yyyy-mm-dd:hh:mm:ss"
    }
]
}
```

In some example embodiments, the service provider tenant 150 may modify the one or more machine learning enabled functions associated with the artificial intelligence resources 113. The updating of the one or more machine learning enabled functions, including any corresponding changes to the generic service broker 164 and various dependent services, may be controlled by the service controller 162. It should be appreciated that such updates do not affect the uniform resource locator of the service broker 164. Table 4 below depicts an example of an application programming interface (API) call to modify a machine learning enabled function.

TABLE 4

PUT admin/aifunctions/{AIFunctionName}
Update AI Function request body (similar to create operation)

The service controller 162 may also be configured to control the deletion of a machine learning enabled function associated with the one or more artificial intelligence resources 113. When a machine learning enabled function is deleted, for example, the service controller 162 may verify whether force deletion annotation is set (e.g., ai.sap.com/forceDelete: true) and make corresponding deprecations to the generic service broker 164 and various dependent services. If the force deletion annotation is not set and if any service consumer tenants 160 still exists for the artificial intelligence resources 113 associated with the machine learning enabled function, the service controller 162 may abort the deletion operation and output a corresponding error message to the service provider tenant 150 when deleting the custom resource associated with the machine learning enabled function. Upon deletion of the machine learning enabled functions associated with the artificial intelligence resources 113, the corresponding function specific service broker 165 will be unregistered and cease to operate thereafter.

In some example embodiments, the dependent services associated with the artificial intelligence resources 113 may be provisioned with a variety of customizable options. For example, the object store may be provisioned to expose admin/objectStoreSecret endpoint from service consumers tenants 160. The object store can also be provisioned with the corresponding object store instance as a dependency that is created in the subaccount of the service consumer tenants 160. The instance of the object store associated with the service provider tenant 150 may be shared using directory-like object store paths (e.g., /tenant/abc/ or/tenant/xyz/).

Meanwhile, the metering and reporting services may be provisioned such that the service provider tenants 150 are metered and billed for usage by all of the service consumer tenants 160 at the level of the machine learning enabled functions associated with the artificial intelligence resources 113. At least a portion of the metering service's wrapper application programming interface (API) may be exposed to support cross charges across the service consumer tenants 160.

FIG. 2B depicts a schematic diagram illustrating an example of a process 250 for onboarding the service consumer tenant 160 to the machine learning enabled function associated with the artificial intelligence resources 113, in accordance with some example embodiments. As shown in FIG. 2B, to onboard the service consumer tenant 160, the service manager 166 may route the request to the function specific service broker 165 associated with the artificial intelligence resources 113. The function specific service broker 165 may create a user authentication and authorization service (e.g., XSUAA) clone and provide an authorized client (e.g., OAuth2 client) as part of service binding. Furthermore, as shown in FIG. 2B, the function specific service broker 165 may call a resource group creation application programming interface (API) 255 to create one or more resource groups 260 for each of the service consumer tenants 160 under the service provider tenant 150. Each instance of the machine learning enabled function provisioned for a corresponding service consumer tenant 160 may be assigned a same identifier as that of the resource group 260 associated with the service consumer tenant 160. Subsequent communications between the service consumer tenant 160 and the core platform 110 to access the artificial intelligence resources 113 may require mutual authentication (e.g., Mutual Transport Layer Security (mTLS)). For example, the service consumer tenant 160 may call the application programing interface (API) of the artificial intelligence resources 113 to invoke executions and deployments of the underlying machine learning models managed by the service provider tenant 150. The core platform 110 may provide events integration for the subsequent offboarding of the service consumer tenants 160. However, manual offboarding is also possible by deleting the corresponding resource groups 260 directly, for example, using the JavaScript Object Notation (JSON) web token (JWT) of the service provider tenant 150.

As noted, the function specific service broker 165 may be created as a part of creating the machine learning enabled functions associated with the artificial intelligence resources 113. FIG. 3B shows that the function specific service broker 165 may be configured to map the service consumer tenants 160 of the artificial intelligence resources 113 to the corresponding resource group 260 of the service provider tenant 150. The function specific service broker 165 may perform this mapping by at least determining, based on a first identifier of the service consumer tenant 160 and a second identifier of artificial intelligence resources 113, a third identifier of the resource group 260 (e.g., Resource Group ID=Service Consumer tenant ID+AI Function ID).

Referring again to FIG. 1B, the configurations of the function specific service broker 165 may be set by the service provider tenant 160 as a part of creating the corresponding artificial intelligence resources 113 (e.g., allow admin endpoints to service consumer tenant 160, allow log endpoints, restrict some core platform 110 runtime capabilities, and/or the like). At runtime, the service consumer tenant 160 may call the function specific service broker 165, which then validates the service consumer tenant 160. For example, the function specific service broker 165 may extract the identifier of the artificial intelligence resources 113 being accessed by the service consumer tenant 160 as well as the identifier of the service consumer tenant 160, which may be the corresponding resource group identifier included in the incoming token (e.g., JavaScript Object Notation (JSON) web token (JWT)). Validation of the resource consumer tenant 160 may then be performed based on the onboarded tenant list, which may be updated by the function specific service broker 165 during the onboarding of the resource consumer tenant 160 to indicate an association between the service consumer tenant 160 and the artificial intelligence resources 113. It should be appreciated that the authentication and authorization of the service consumer tenant 160 may be performed in a variety of ways including, for example, using JavaScript Object Notation (JSON) web token (JWT) validation techniques such as signature check, token validity, scopes, audience, and/or the like. Upon successfully validating the resource consumer tenant 160, the function specific service broker 165 may forward the request to workloads in the corresponding resource group 160 by setting appropriate request headers and virtual service routing definitions.

Table 5 below depicts an example of a template for creating machine learning scenarios that defines the workflow, for example, of the artificial intelligence resources 113.

TABLE 5

```
apiVersion: ai.sap.com/v1alpha1
kind: ServingTemplate
metadata:
    name: text-clf-infer-tutorial
    annotations:
        scenarios.ai.sap.com/description: "SAP developers tutorial scenario"
        scenarios.ai.sap.com/name: "text-clf-tutorial-scenario"
        executables.ai.sap.com/description: "Inference executable for text
classification with Scikit-learn"
        executables.ai.sap.com/name: "text-clf-infer-tutorial-exec"
labels:
        scenarios.ai.sap.com/id: "text-clf-tutorial"
        executables.ai.sap.com/id: "text-clf-infer-tutorial"
        ai.sap.com/version: "1.0.0"
spec:
    inputs:
        parameters: [ ]
        artifacts:
            - name: textmodel
    template:
        spec: |
            predictor:
                minReplicas: 1
                containers:
```

TABLE 5-continued

```
            - name: kfserving-container
                image: "<DOCKER IMAGE URL GOES HERE>"
            ports:
                - containerPort: 9001
                protocol: TCP
            env:
                - name: STORAGE_URI
            value
```

FIG. 4 depicts a flowchart illustrating an example of a process 400 for exposing artificial intelligence content as a cloud service, in accordance with some example embodiments. Referring to FIG. 4, the process 400 may be performed by the core platform 110 to expose, for example, the artificial intelligence resources 113 developed by the resource provider tenant 150 for direct or indirect consumption (e.g., via the application) by the one or more resource consumer tenants 160.

At 402, the service broker 164 of the core platform 110 hosting the artificial intelligence resource 113 may onboard the one or more service provider tenants 150 providing the artificial intelligence resource 113 including by creating the function specific service broker 165 associated with the artificial intelligence resource 113 at the core platform 110. In some example embodiments, the core platform 110 may host the cloud access control resources 115, which are shared across the service provider tenants 150 including the first service provider tenant 150*a* and the second service provider tenant 150*b*. The cloud access control resources 115 may include the service broker 164, which is configured to onboard the service provider tenants 150 such that the artificial intelligence resources 113 developed by the service provider tenants 150 may be exposed for direct or indirect consumption by the one or more service consumer tenants 160. The onboarding of the service provider tenants 150 the creation and provisioning of a content package associated with the one or more artificial intelligence resources 113. Moreover, the onboarding of the service provider tenants 150 may include the creation of the function specific service broker 165, which is associated specifically with the artificial intelligence resources 113 to onboard the service consumer tenants 160 accessing the artificial intelligence resources 113.

At 404, the function specific service broker 165 of the core platform 110 may onboard one or more service consumer tenants 160 for accessing the artificial intelligence resource 113 associated with the one or more service provider tenants 150. In some example embodiments, the function specific service broker 165 may onboard the one or more service consumer tenants 160 by creating the one or more corresponding resource groups 260. For example, as shown in FIG. 2B, the function specific service broker 165 may call the resource group creation application programming interface (API) 255 to create the one or more resource groups 260 for each of the service consumer tenants 160 under the service provider tenant 150. The function specific service broker 165 may map the service consumer tenants 160 to the corresponding resource group 260 of the service provider tenant 150 by at least determining, based on a first identifier of the service consumer tenant 160 and a second identifier of artificial intelligence resources 113, a third identifier of the resource group 260 (e.g., Resource Group ID=Service Consumer tenant ID+AI Function ID).

At 406, the function specific service broker 165 may respond to the one or more service consumer tenants 160 accessing the artificial intelligence resource 113 by at least authenticating the one or more service consumer tenants 160 and metering a usage of the artificial intelligence resource 113 associated with the one or more service consumer tenants 160. In some example embodiments, at runtime, the service consumer tenant 160 may call the function specific service broker 165, which then validates the service consumer tenant 160, for example, based on the identifier of the artificial intelligence resources 113 being accessed by the service consumer tenant 160 and the identifier of the service consumer tenant 160. The function specific service broker 165 may map the service consumer tenants 160 to the corresponding resource group 260 of the service provider tenant 150 by at least determining, based on a first identifier of the service consumer tenant 160 and a second identifier of artificial intelligence resources 113, a third identifier of the resource group 260 (e.g., Resource Group ID=Service Consumer tenant ID+AI Function ID). Upon successfully validating the resource consumer tenant 160, the service controller 162 may deploy the function specific service broker 165 and provision various dependent services such as metering and reporting services such that the service provider tenants 150 are metered and billed for usage by all of the service consumer tenants 160 at the level of the machine learning enabled functions associated with the artificial intelligence resources 113.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions, which when executed by the at least one data processor, result in operations comprising: onboarding, by a service broker of a core platform hosting an artificial intelligence (AI) resource, a first service provider tenant providing the artificial intelligence resource, the onboarding of the first service provider tenant includes creating, at the core platform, a function specific service broker associated with the artificial intelligence resource; onboarding, by the function specific service broker, one or more service consumer tenants for accessing the artificial intelligence resource associated with the first provider tenant; and in response to the one or more service consumer tenants accessing the artificial intelligence resource, authenticating, by the function specific service broker, the one or more service consumer tenants and metering a usage of the artificial intelligence resource by the one or more service consumer tenants.

Example 2: The system of Example 1, wherein the onboarding of the first service provider tenant includes receiving, from the first service provider tenant, a custom resource definition defining a runtime behavior of each machine learning enabled function included in the artificial intelligence resource, and registering the function specific service broker associated with the artificial intelligence resource.

Example 3: The system of any of Examples 1 to 2, wherein the service broker of the core platform comprises a shared resource amongst the first service provider tenant and a second service provider tenant.

Example 4: The system of any of Examples 1 to 3, wherein the one or more service consumer tenants are sub-tenants of the first service provider tenant.

Example 5: The system of any of Examples 1 to 4, wherein the onboarding of the one or more service consumer tenants includes creating, for each service consumer tenant, a resource group mapped to the artificial intelligence resource.

Example 6: The system of Example 5, wherein the operations further comprise: in response to a service consumer tenant accessing the artificial intelligence resource, mapping the service consumer tenant to a corresponding resource group in order to create an execution or deployment of a machine learning enabled function associated with the artificial intelligence resource and meter a usage corresponding to the execution or deployment of the machine learning enabled function.

Example 7: The system of Example 6, wherein the mapping includes determining, based at least on a first identifier of the service consumer tenant and a second identifier of the artificial intelligence resource, a third identifier of the corresponding resource group.

Example 8: The system of any of Examples 1 to 7, wherein the onboarding of the one or more service consumer tenants includes updating an onboarded tenant list to indicate an association between the one or more service consumer tenants and the artificial intelligence resource, and wherein the function specific service broker authenticates the one or more service consumer tenant based at least on the onboarded tenant list.

Example 9: The system of any of Examples 1 to 8, wherein the artificial intelligence resource is embedded within an application and exposed for indirect consumption by the one or more service consumer tenants.

Example 10: The system of any of Examples 1 to 9, wherein the artificial intelligence resource is exposed for direct consumption by the one or more service consumer tenants.

Example 11: The system of any of Examples 1 to 10, wherein the artificial intelligence resource includes one or more machine learning enabled functions.

Example 12: The system of any of Examples 1 to 11, wherein the operations further comprise: routing, by a service manager, an onboard request from the one or more service consumer tenants to the function specific service broker associated with the artificial intelligence resource.

Example 13: A computer-implemented method, comprising: onboarding, by a service broker of a core platform hosting an artificial intelligence (AI) resource, a first service provider tenant providing the artificial intelligence resource, the onboarding of the first service provider tenant includes creating, at the core platform, a function specific service broker associated with the artificial intelligence resource; onboarding, by the function specific service broker, one or more service consumer tenants for accessing the artificial intelligence resource associated with the first provider tenant; and in response to the one or more service consumer tenants accessing the artificial intelligence resource, authenticating, by the function specific service broker, the one or more service consumer tenants and metering a usage of the artificial intelligence resource by the one or more service consumer tenants.

Example 14: The method of Example 13, wherein the onboarding of the first service provider tenant includes receiving, from the first service provider tenant, a custom resource definition defining a runtime behavior of each machine learning enabled function included in the artificial intelligence resource, and registering the function specific service broker associated with the artificial intelligence resource.

Example 15: The method of any of Examples 13 to 14, wherein the service broker of the core platform comprises a shared resource amongst the first service provider tenant and a second service provider tenant.

Example 16: The method of any of Examples 13 to 15, wherein the one or more service consumer tenants are sub-tenants of the first service provider tenant.

Example 17: The method of any of Examples 13 to 16, further comprising: creating, for each service consumer tenant, a resource group mapped to the artificial intelligence resource as a part of the onboarding of the one or more service consumer tenants; and in response to a service consumer tenant accessing the artificial intelligence resource, mapping the service consumer tenant to a corresponding resource group in order to create an execution or deployment of a machine learning enabled function associated with the artificial intelligence resource and meter a usage corresponding to the execution or deployment of the machine learning enabled function, the mapping includes determining, based at least on a first identifier of the service consumer tenant and a second identifier of the artificial intelligence resource, a third identifier of the corresponding resource group.

Example 18: The method of any of Examples 13 to 17, wherein the onboarding of the one or more service consumer tenants includes updating an onboarded tenant list to indicate an association between the one or more service consumer tenants and the artificial intelligence resource, and wherein the function specific service broker authenticates the one or more service consumer tenant based at least on the onboarded tenant list.

Example 19: The method of any of Examples 13 to 18, further comprising: routing, by a service manager, an onboard request from the one or more service consumer tenants to the function specific service broker associated with the artificial intelligence resource.

Example 20: A non-transitory computer readable medium storing instructions, which when executed by at least one data processor, result in operations comprising: onboarding, by a service broker of a core platform hosting an artificial intelligence (AI) resource, a first service provider tenant providing the artificial intelligence resource, the onboarding of the first service provider tenant includes creating, at the core platform, a function specific service broker associated with the artificial intelligence resource; onboarding, by the function specific service broker, one or more service consumer tenants for accessing the artificial intelligence resource associated with the first provider tenant; and in response to the one or more service consumer tenants accessing the artificial intelligence resource, authenticating, by the function specific service broker, the one or more service consumer tenants and metering a usage of the artificial intelligence resource by the one or more service consumer tenants.

FIG. 5 depicts a block diagram illustrating a computing system 500, in accordance with some example embodiments. Referring to FIGS. 1-5, the computing system 500 can be used to implement the core platform 110 and/or any components therein.

As shown in FIG. 5, the computing system 500 can include a processor 510, a memory 520, a storage device 530, and input/output devices 540. The processor 510, the memory 520, the storage device 530, and the input/output devices 540 can be interconnected via a system bus 550. The processor 510 is capable of processing instructions for execution within the computing system 500. Such executed instructions can implement one or more components of, for example, the core platform 110. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed is:

1. A system, comprising:

at least one data processor; and at least one memory storing instructions which, when executed by the at least one data processor, result in operations comprising:

onboarding, by a service broker of a core platform configured to host artificial intelligence (AI) resources, a first service provider tenant providing a first AI resource including one or more machine learning enabled functions, wherein the onboarding of the first service provider tenant includes:

receiving, from the first service provider tenant, a custom resource definition defining a runtime behavior of each machine learning enabled function included in the first AI resource, creating, at the core platform, a function specific service broker associated with the first AI resource, and registering the function specific service broker;

onboarding, by the function specific service broker, each of one or more service consumer tenants for accessing the first AI resource associated with the first service provider tenant, wherein the onboarding of each of the one or more service consumer tenants comprises:

creating a resource group associated with the first AI resource, mapping the service consumer tenant to the resource group by determining an identifier of the resource group based on an identifier of the service consumer tenant and an identifier of the first AI resource, and updating an onboarded tenant list to indicate an association between the service consumer tenant and the first AI resource; and in response to the one or more service consumer tenants accessing the first AI resource, authenticating, by the function specific service broker, the one or more service consumer tenants based on the onboarded tenant list, and metering a usage of the first AI resource by the one or more authenticated service consumer tenants based on the associated resource groups.

2. The system of claim 1, wherein the service broker of the core platform comprises a shared resource amongst the first service provider tenant and a second service provider tenant.

3. The system of claim 1, wherein the one or more service consumer tenants are sub-tenants of the first service provider tenant.

4. The system of claim 1, wherein the authenticating of the one or more service consumer tenants includes extracting the identifiers of the one or more service consumer tenants and the identifier of the first AI resource from service calls made by the one or more service consumer tenants.

5. The system of claim 1, wherein the first AI resource is embedded within an application and exposed for indirect consumption by the one or more service consumer tenants.

6. The system of claim 1, wherein the first AI resource is exposed for direct consumption by the one or more service consumer tenants.

7. The system of claim 1, wherein the operations further comprise:

routing, by a service manager, an onboard request from the one or more service consumer tenants to the function specific service broker associated with the first AI resource.

8. A computer-implemented method, comprising:

onboarding, by a service broker of a core platform configured to host artificial intelligence (AI) resources, a first service provider tenant providing a first AI resource including one or more machine learning enabled functions, wherein the onboarding of the first service provider tenant includes:

receiving, from the first service provider tenant, a custom resource definition defining a runtime behavior of each machine learning enabled function included in the first AI resource, creating, at the core platform, a function specific service broker associated with the first AI resource, and registering the function specific service broker;

onboarding, by the function specific service broker, each of one or more service consumer tenants for accessing the first AI resource associated with the first service provider tenant, wherein the onboarding of each of the one or more service consumer tenants comprises:

creating a resource group associated with the first AI resource, mapping the service consumer tenant to the resource group by determining an identifier of the resource group based on an identifier of the service consumer tenant and an identifier of the first AI resource, and updating an onboarded tenant list to indicate an association between the service consumer tenant and the first AI resource; and in response to the one or more service consumer tenants accessing the first AI resource, authenticating, by the function specific service broker, the one or more service consumer tenants based on the onboarded tenant list, and metering a usage of the first AI resource by the one or more authenticated service consumer tenants based on the associated resource groups.

9. The method of claim 8, wherein the service broker of the core platform comprises a shared resource amongst the first service provider tenant and a second service provider tenant.

10. The method of claim 8, wherein the one or more service consumer tenants are sub-tenants of the first service provider tenant.

11. The method of claim 8, wherein the authenticating of the one or more service consumer tenants includes extracting the identifiers of the one or more service consumer tenants and the identifier of the first AI resource from service calls made by the one or more service consumer tenants.

12. The method of claim 8, further comprising:

routing, by a service manager, an onboard request from the one or more service consumer tenants to the function specific service broker associated with the first AI resource.

13. A non-transitory computer readable medium storing instructions, which when executed by at least one data processor, result in operations comprising:

onboarding, by a service broker of a core platform configured to host artificial intelligence (AI) resources, a first service provider tenant providing a first AI resource including one or more machine learning enabled functions, wherein the onboarding of the first service provider tenant includes:

receiving, from the first service provider tenant, a custom resource definition defining a runtime behavior of each machine learning enabled function included in the first AI resource, creating, at the core platform, a function specific service broker associated with the first AI resource, and registering the function specific service broker;

onboarding, by the function specific service broker, each of one or more service consumer tenants for accessing the first AI resource associated with the first service provider tenant, wherein the onboarding of each of the one or more service consumer tenants comprises:

creating a resource group associated with the first AI resource, mapping the service consumer tenant to the resource group by determining an identifier of the resource group based on an identifier of the service consumer tenant and an identifier of the first AI resource, and updating an onboarded tenant list to indicate an association between the service consumer tenant and the first AI resource; and in response to the one or more service consumer tenants accessing the first AI resource, authenticating, by the function specific service broker, the one or more service consumer tenants based on the onboarded tenant list, and metering a usage of the first AI resource by the one or more authenticated service consumer tenants based on the associated resource groups.

* * * * *